May 26, 1970 — R. M. IRWIN — 3,514,005

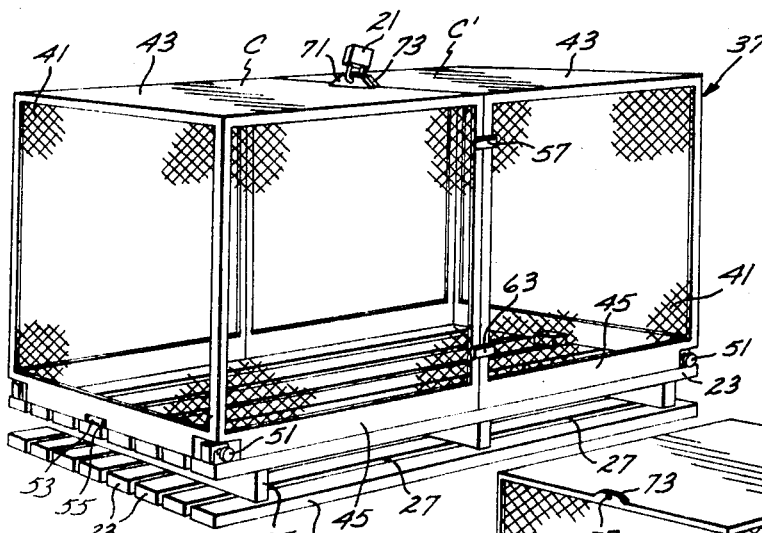
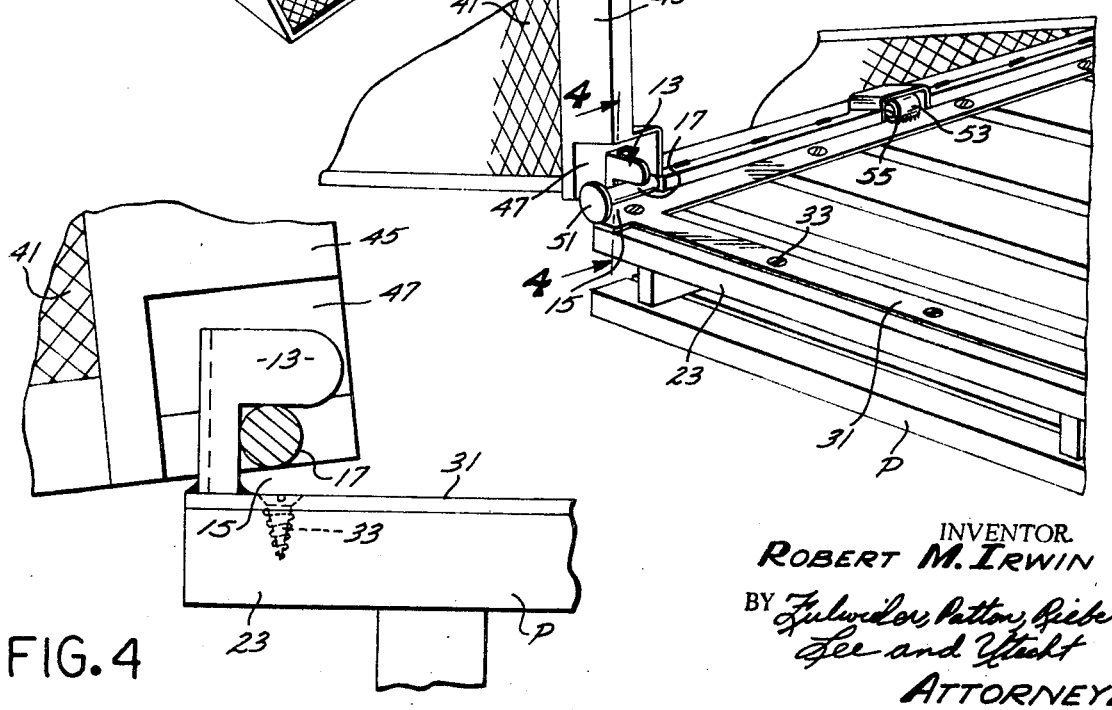

COVERED PALLET APPARATUS

Filed Sept. 9, 1968 — 2 Sheets-Sheet 2

INVENTOR.
ROBERT M. IRWIN

BY Fulwider, Patton, Rieber, Lee and Utecht
ATTORNEYS

United States Patent Office

3,514,005
Patented May 26, 1970

---

3,514,005
COVERED PALLET APPARATUS
Robert M. Irwin, 3249 Cherry Ave.,
Long Beach, Calif. 90806
Continuation-in-part of application Ser. No. 687,526,
Dec. 14, 1967. This application Sept. 9, 1968, Ser.
No. 769,774
Int. Cl. B65j 1/02; B65d 7/20, 9/12
U.S. Cl. 220—1.5                                    9 Claims

ABSTRACT OF THE DISCLOSURE

A covered pallet apparatus comprising a substantially flat pallet including first and second pairs of hinge elements at its opposite extremities, such hinge elements including confronting inwardly opening bolt receiving notches. A pair of cages are provided for forming a closure over the pallet and each includes a pair of axially aligned bolts which fit into the respective notches and are held captive therein when the cages are in their pallet covering position. The cages are pivotable around the axis defined by the bolts to open the pallet apparatus and locking means is provided for locking the upper adjacent portion of the cages together in the closed position.

---

This application is a continuation-in-part of patent application Ser. No. 687,526 filed Dec. 14, 1967, now abandoned.

BACKGROUND OF THE INVENTION

Field of the invention

The present invention relates generally to pallets of the type moved by fork trucks and more specifically to a covered pallet.

Description of prior art

There are no pallets known to applicant which have cages thereon for being closed to prevent unauthorized removal of items stored on the pallet and which can be quickly removed from the pallet.

SUMMARY OF THE INVENTION

The present invention is characterized by a pallet covered by a pair of cages that can be pivoted to their open position and rapidly removed from the pallet.

Other objects and features of the invention will become apparent from consideration of the following description taken in connection with the accompanying drawings.

DESCRIPTION OF THE DRAWINGS

FIG. 1 is a perspective view of a covered pallet embodying the present invention;

FIG. 2 is a perspective view similar to FIG. 1;

FIG. 3 is a partial perspective view, in enlarged scale, of the pallet shown in FIG. 1;

FIG. 4 is a partail vertical sectional view taken along the line 4—4 of FIG. 3;

DESCRIPTION OF THE PREFERRED EMBODIMENT

Figure 5:
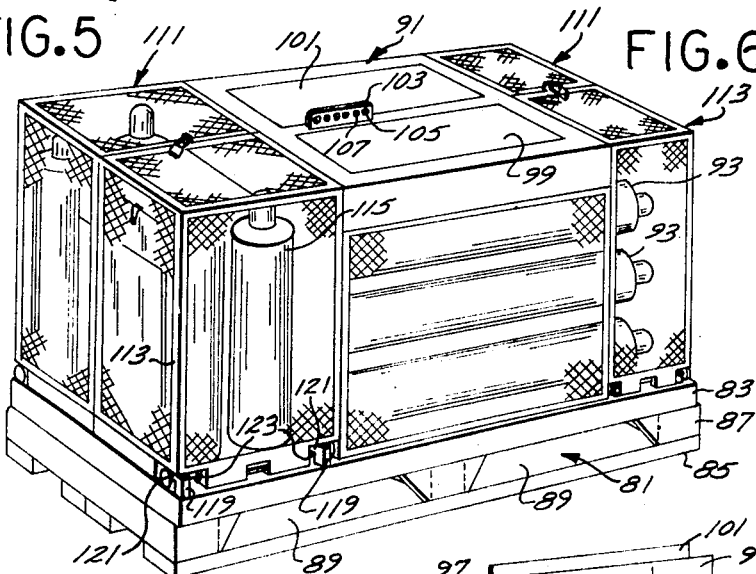
FIG. 5 is a perspective view of a second embodiment of the covered pallet of present invention.

Referring to FIG. 1, the pallet apparatus of present invention includes a conventional pallet P and a pair of covering cages C and C', the cage C' being a mirror image of the cage C. Referring to FIGS. 3 and 4, the pallet P includes two pairs of hinge elements, generally designated 13, which form inwardly opening confronting notches 15. The cages C and C' include transversely extending bolts 17 which are received in the notches 15 whereby the cages C can be positioned on the pallet P with the bolts 17 received in the notches 15 and the cages locked together by a padlock 21 to secure them on the pallet.

The pallet P includes upper and lower sets of planks 23 which are separated by transverse spacers 25 thus forming transverse passages 27 for receiving the tines of the fork truck. A border in the form of a metal band 31 is secured to the periphery of the pallet P by a plurality of screws 33.

The hinge elements 13 are in the form of upstanding angles welded to the metal band 31 and having the notch 15 cut therein.

The cages C and C' include angle iron frames, generally designated 37, and have heavy gauge wire mesh 41 welded to such frames. The top wall of the cages C and C' are in the form of a metal sheet 43, the bottom sides and confronting ends of the cages C being open.

Relatively wide borders 45 are provided around the bases of the frames 37 and such borders include a pair of cavities 47 in which the bolts 17 are disposed. The bolts 17 include circular end flanges 51 for engaging the hinge elements 13 to limit longitudinal movement of such bolts and prevent them from being disengaged from such hinge elements.

An auxiliary stop in the form of a piece of hollow round stock 53 is welded to the pallet border 31 at each end of the pallet P. A recess 55 is formed in the cage borders 45 for receiving auxiliary stops 53, the ends of such recesses being adapted to engage the respective ends of the stops 53 to prevent sideways shifting of the respective cages C and C'.

The confronting ends of the cages C and C' include guide tabs 57, 59, 61 and 63. These guide tabs lie outside of the mating cage C or C' and overfit such cage when the pallet apparatus is closed as shown in FIG. 1.

Upwardly extending flanges 71 and 73 are included on the cages C and C', respectively, and have bores 75 and 77, respectively, therethrough for receiving the bale of the padlock 21.

The covered pallet shown in FIG. 5 includes a pallet, generally designated 81, of metal construction and including top and bottom walls 83 and 85 separated by transverse spacers 87 to define fork receiving passages 89. A central rack, generally designated 91, is mounted on the pallet 81 and includes a plurality of open ended compartments for receiving oxygen bottles 93. The upper portion of the rack 91 is formed with a pair of side-by-side compartments 95 and 97 which are covered by hinged doors 99 and 101, respectively. Mounted centrally on the top of the rack 91 is a pick-up bracket 103 having a plurality of spaced bores 105 therein for receiving a pick-up hook (not shown).

A pair of cages, generally designated 111, and 113, are disposed at each end of the rack 91, the cage on the right-hand end restricting access to the oxygen bottles 93 and the cages on the left-hand end forming a closure for acetylene bottles 115. Welded to the floor 83 of the pallet 81 are hinge elements 119 having tabs 121 thereon which hook over bolts 123 included in the cages 111 and 13 similar to the tab and bolt arrangement shown in FIG. 4.

Figure 6:
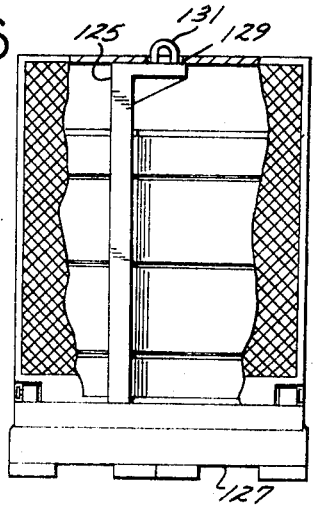
FIG. 6 is a partially broken away end view of a third embodiment of the covered pallet of present invention.

Referring to FIG. 6, the pallet device shown includes a vertical lifting post 125 welded to the pallet 127 and including a transverse arm 129 for supporting a lifting hook 131 disposed centrally relative to the weight distribution on the pallet 127. The post 125 may include struts (not shown) on its lower end for connection at several locations to the pallet 127.

Figure 8:
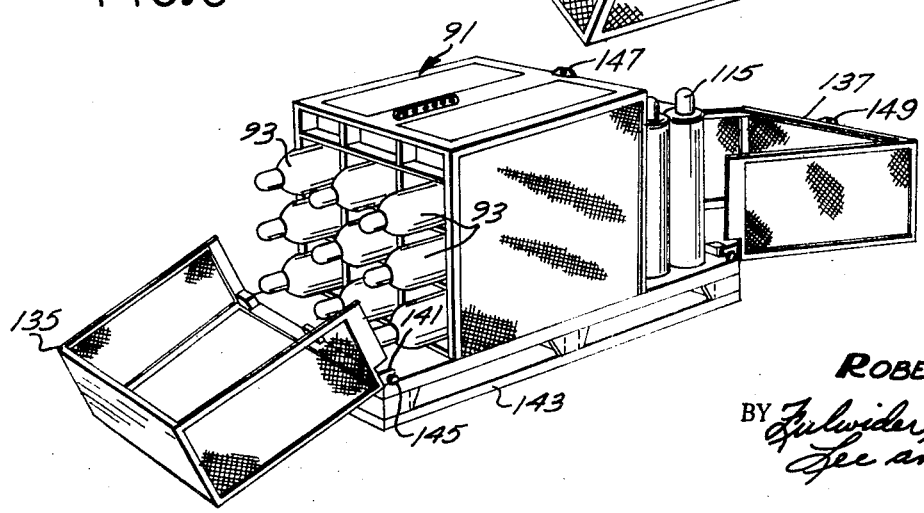
FIG. 8 is a perspective view of a fourth embodiment of the covered pallet of present invention.

Referring to FIG. 8, the covered pallet shown therein includes a rack 91 having cages 135 and 137 confronting the opposite ends thereof for restricting access to the oxygen bottles 93 and defining a closure for the acetylene bottles 115. Hinge elements 141 are welded to the pallet 143 and bolts 145 are included in the cages 135 and 137 similar to the arrangement shown in FIG. 4. Upwardly extending flanges 147 and 149 are included on the rack 91 and cage 137, respectively, and includes bores therein for receipt of a padlock bale similar to the flange and padlock arrangement shown in FIG. 1.

In operation, the cages C and C' are entirely removed from the pallet P while the pallet is being loaded. Pallets P of this type are frequently utilized for carrying a plurality of fuel drums and with the cages C and C' removed such drums may be easily rolled onto the pallet P and arranged thereon for convenient conveyance. One of the cages C or C' will then be moved into covering position on the pallet P, as for instance C' (FIG. 2), and the bolts 17 brought into engagement with the respective hinge elements 13. Assuming that cage C' was the first to be installed, the cage C would then be brought into position with its open end facing upwardly as shown in FIG. 2. The bolts 17 of the cage C will then be engaged with the hinge elements 13 and the cage C then pivoted around the hinge elements and brought into closing relationship with the cage C'. The padlock 21 will then be locked with its bale extending through the bores 75 and 77. With the cages C and C' so arranged on the pallet, they cannot be removed without breaking the padlock 21.

With the hinge elements 13 and bolts 17 disposed within the cavities 47, access to the hinge elements 13 is restricted and it will be very difficult for any unauthorized person to obtain access to the hinge element to bend it out of engagement with the bolts 17. Even if an unauthorized person could gain access to the hinge element 13, the tab extending above the bolts 17 could not be bent outwardly because of the end flanges 51.

If an unauthorized person were successful in removing one of the hinge elements 13, the cages C and C' could still not be removed because the auxiliary stop 53 would prevent the cages from being slid longitudinally on the pallet P to disengage the bolts 17, at the opposite end of the pallet, from their respective hinge elements 13. As noted above, the auxiliary stop 53 also prevents the cages C and C' from being moved transversely on the pallet P to disengage the bolts 17 from their respective hinge elements 13.

When the pallet P has been deposited at its destination the padlock 21 can easily be unlocked and the cages C and C' entirely moved from the pallet P to render the material supported thereon readily accessible.

Figure 7:
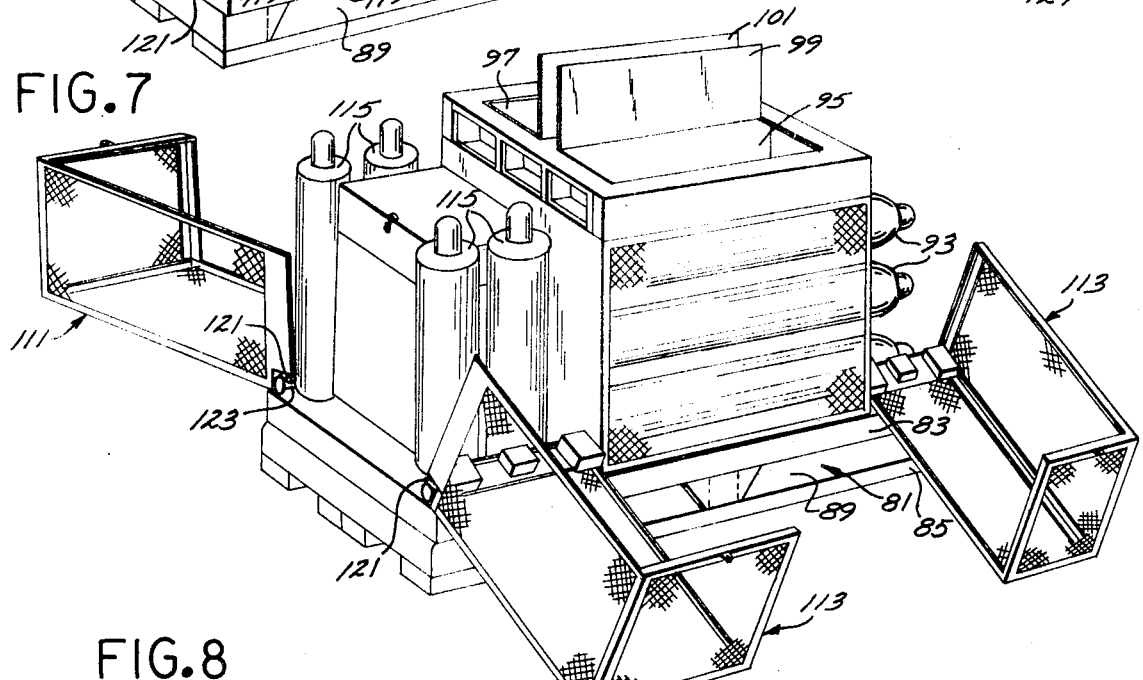
FIG. 7 is a perspective view similar to FIG. 5 and showing the pallet open.

Operation of the pallet shown in FIG. 5 is substantially the same as that described above except that the cages 111 and 115 conveniently open to the sides of the pallet 81, as shown in FIG. 7.

From the foregoing it will be clear that the covered pallet apparatus of present invention is straight-forward in design and inexpensive to manufacture. The pallet apparatus is convenient to use and provides for theft-proof enclosure of materials stored on the pallet P.

Various modifications and changes may be made with regard to the foregoing detailed description without departing from the spirit of the invention or the scope of the following claims.

I claim:

1. Covered pallet apparatus comprising:
   a pallet having horizontal passages for receiving the tines of a fork lift and including first and second pairs of aligned, spaced apart, hinge elements disposed at opposite ends of said pallet, said hinge elements including confronting inwardly opening bolt-receiving notches;
   a pair of cages, open on their bottom and confronting sides and normally cooperating with said pallet to form a closure defining a storage space, said cages including axially aligned bolts normally disposed in said bolt-receiving notches and maintained captively therein when said cages are in their pallet covering position, said cages being pivotable around the respective axis defined by said pair of bolts to uncover said pallet and free said bolts from said notches whereby said cages may be entirely removed from said pallet; and
   locking means for fastening the confronting ends of said cages together when they are in their pallet covering position to prevent unauthorized removal of articles from said storage space.

2. Covered pallet apparatus as set forth in claim 1 wherein said pallet includes a safety stop disposed on one end for abutting one of said cages to limit movement of said cages toward said one end to prevent disengagement of the bolts included in said other cage from the respective notches.

3. Covered pallet apparatus as set forth in claim 1 wherein each one of said cages includes guides for cooperating with the other of said cages to align the open ends of said cages when said cages are pivoted into their closed positions.

4. Covered pallet apparatus as set forth in claim 1 wherein one of said cages includes: a flange affixed to the outer end of one of said bolts for engaging said pallet to limit sideways movement of said one cage and prevent said one bolt from disengaging its respective hinge element.

5. Covered pallet apparatus as set forth in claim 1 wherein said cages include cavities and said bolts and hinge elements are disposed therein when said apparatus is closed to restrict access to said hinge elements.

6. Covered pallet apparatus as set forth in claim 1 that includes: a storage compartment interposed between said cages and having an opening covered by one of said cages when said one cage is in its pallet covering position.

7. Covered pallet apparatus as set forth in claim 1 that includes: pick-up means mounted on said pallet and including a hook projecting above said pallet.

8. Covered pallet apparatus as set forth in claim 1 that includes: pick-up means including a bracket formed with a plurality of spaced apart bores for selective connection with a pick-up hoop in accordance with the weight distribution on said pallet.

9. Covered pallet apparatus comprising:
   pallet means having horizontal passages for receiving the tines of a fork lift;
   hinge means including inwardly projecting rigid hinge elements cooperating with said pallet means to define respective inwardly opening bolt-receiving notches;
   cage means for covering said pallet to form a closure defining a storage area, said cage means including axially aligned bolts for engagement in said notches; and locking means for securing the end of said cage means opposite said one end to said pallet means to retain said cage means against shifting on said pallet means thereby holding said bolts captive in said notches to lock said cage in covering position on said pallet means whereby said locking means can be unlocked and said cage pivoted back about said bolts to free said bolts to be disengaged from said notches to enable said cage means to be conveniently removed from said pallet means.

References Cited

UNITED STATES PATENTS

| | | | |
|---|---|---|---|
| 2,695,210 | 11/1951 | Evans | 220—4 X |
| 2,720,996 | 10/1955 | Anderson | 220—1.5 |
| 2,851,186 | 9/1958 | Rupe | 220—4 |
| 2,975,929 | 3/1961 | Sjöblom | 220—4 |
| 3,259,309 | 7/1966 | Johansson | 220—1.5 X |

GEORGE E. LOWRANCE, Primary Examiner

U.S. Cl. X.R.

217—47; 220—7, 19